(12) United States Patent
Kim et al.

(10) Patent No.: US 9,524,124 B2
(45) Date of Patent: Dec. 20, 2016

(54) SEMICONDUCTOR DEVICE

(71) Applicant: SK hynix Inc., Icheon-si, Gyeonggi-do (KR)

(72) Inventors: Dong-Gun Kim, Hwaseong-si (KR);
Yong-Kee Kwon, Icheon-si (KR);
Hong-Sik Kim, Seongnam-si (KR)

(73) Assignee: SK HYNIX INC., Icheon-Si (KR)

( * ) Notice: Subject to any disclaimer, the term of this patent is extended or adjusted under 35 U.S.C. 154(b) by 117 days.

(21) Appl. No.: 14/523,363

(22) Filed: Oct. 24, 2014

(65) Prior Publication Data

US 2015/0347290 A1 Dec. 3, 2015

(30) Foreign Application Priority Data

Jun. 3, 2014 (KR) .................. 10-2014-0067947

(51) Int. Cl.
*G06F 12/00* (2006.01)
*G06F 3/06* (2006.01)

(52) U.S. Cl.
CPC ........... *G06F 3/0688* (2013.01); *G06F 3/0616* (2013.01); *G06F 3/0644* (2013.01)

(58) Field of Classification Search
CPC .. G06F 12/0246; G06F 3/0644; G06F 3/0616; G06F 3/0688

USPC .......................................... 711/103, E12.002
See application file for complete search history.

(56) References Cited

U.S. PATENT DOCUMENTS

| | | | |
|---|---|---|---|
| 8,239,619 B2 * | 8/2012 | Hung | G06F 12/0246 711/103 |
| 8,615,640 B2 * | 12/2013 | Jibbe | G06F 12/0246 711/103 |
| 2008/0183949 A1 | 7/2008 | Ly et al. | |
| 2012/0233484 A1 * | 9/2012 | Rossi | G06F 1/3268 713/324 |
| 2014/0269065 A1 * | 9/2014 | Jigour | G11C 29/04 365/185.09 |
| 2014/0281361 A1 * | 9/2014 | Park | G06F 3/0641 711/206 |

* cited by examiner

*Primary Examiner* — Pierre-Michel Bataille
(74) *Attorney, Agent, or Firm* — William Park & Associates Ltd.

(57) ABSTRACT

A semiconductor device may include a first memory cell array configured to store data according to a first address on a first basis, a second memory cell array configured to store data according to a second address on a second basis that is relatively smaller than the first basis, a memory selector configured to select one of the first memory cell array and the second memory cell array to store data during a write request, and an address map table configured to store mapping information between the first and second addresses for data stored in the second memory cell array.

14 Claims, 5 Drawing Sheets

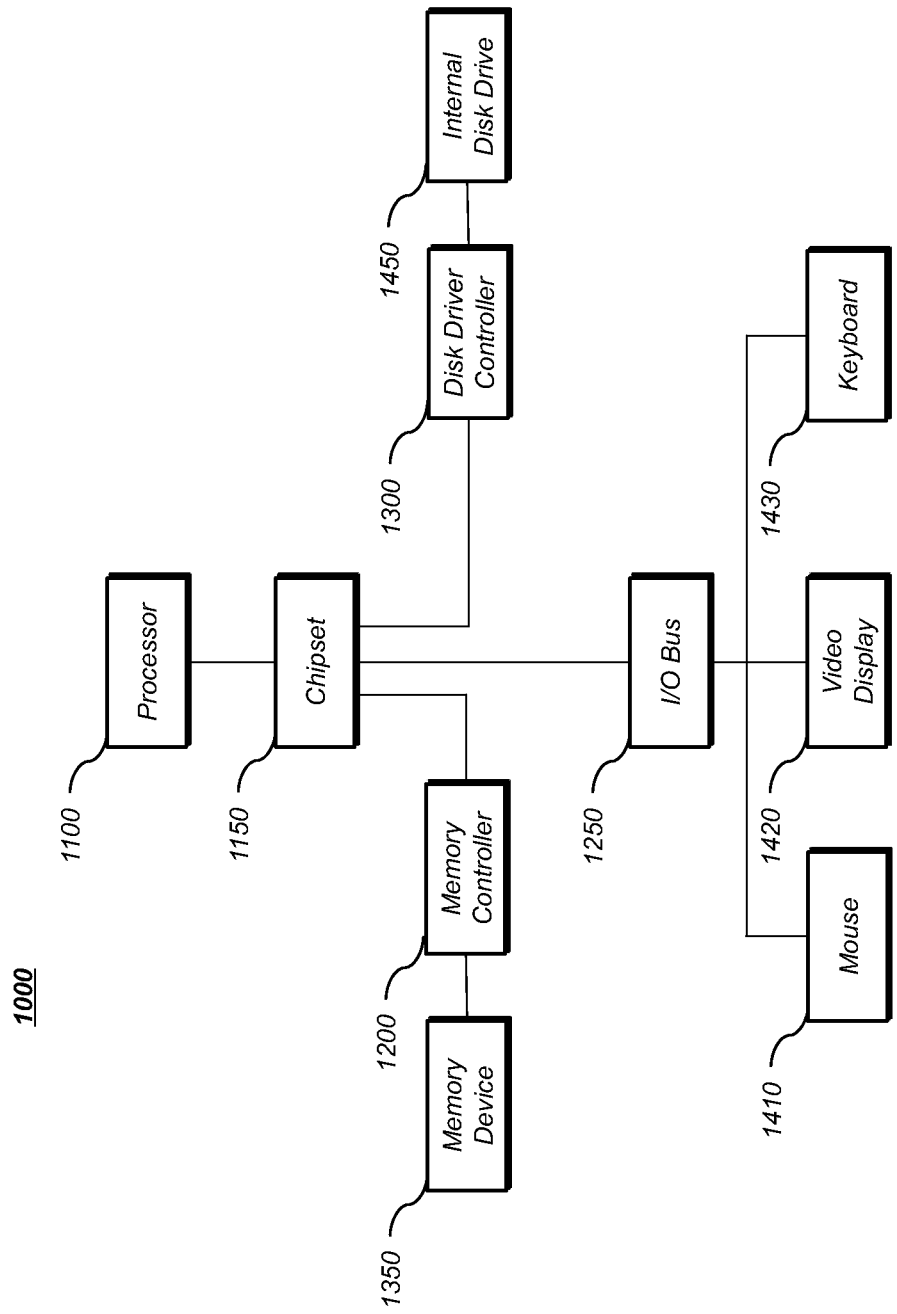

SEMICONDUCTOR DEVICE

CROSS-REFERENCE TO RELATED APPLICATIONS

The present application claims priority of Korean Patent Application No. 10-2014-0067947, filed on Jun. 3, 2014, which is incorporated herein by reference in its entirety.

BACKGROUND

1. Field

Embodiments relate to a semiconductor device, and more particularly, to a semiconductor device configured to reduce a number of RMW (Read-Modify-Write) operations.

2. Description of the Related Art

A typical NAND flash device is configured to perform a program operation on a page basis. Examples of page sizes include 4 KB, 8 KB, and 16 KB. A block device typically performs an access on a sector basis of 512 B. When processing a request is received from a block device, the NAND flash memory device performs a program operation on a portion of a page.

During the performance of a prior art RMW (Read Modify Write) operation, an existing page is read and stored in a page register, a changed part of the page is modified, and the entire page is rewritten.

SUMMARY

In an embodiment, a semiconductor device may include a first memory cell array configured to store data according to a first address on a first basis, a second memory cell array configured to store data according to a second address on a second basis that is relatively smaller than the first basis, a memory selector configured to select one of the first memory cell array and the second memory cell array to store data during a write request, and an address map table configured to store mapping information between the first and second addresses for data stored in the second memory cell array.

BRIEF DESCRIPTION OF THE DRAWINGS

FIG. 5 is a block diagram representation of a system including an embodiment of the semiconductor device of FIG. 1.

DETAILED DESCRIPTION

Figure 1:
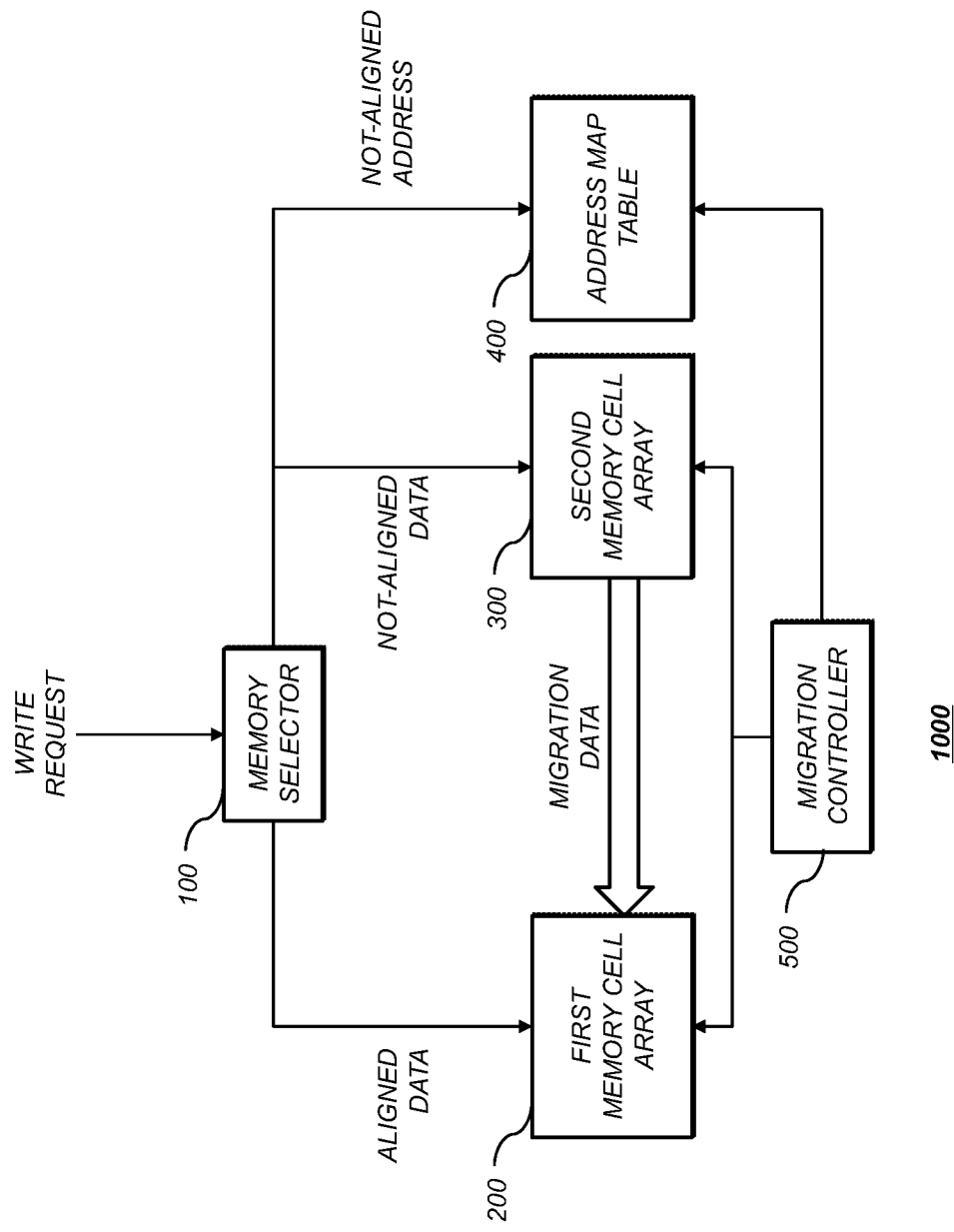
FIG. 1 is a block diagram representation of an embodiment of a semiconductor device.

Various embodiments will be described below in more detail with reference to the accompanying drawings. Throughout the disclosure, like reference numerals refer to like parts throughout the various figures and embodiments.

FIG. 1 is a block diagram representation of an embodiment of a semiconductor device 1000.

An embodiment of the semiconductor device 1000 may include a memory selector 100, a first memory cell array 200, a second memory cell array 300, and an address map table 400.

The memory selector 100 may receive a write request and select the type of a memory cell that will be used to store write data according to the write request.

The first memory cell array 200 stores data on a first basis, such as for example a page basis, and may be implemented using a NAND memory cell array. The second memory cell array 300 stores data on a second basis that is relatively smaller than the first basis, such as for example a sector basis, and may be implemented using a PCRAM cell array 300.

An embodiment will be described using the NAND cell array 200 as an example of a first memory cell array 200 and the PCRAM cell array 300 as an example of a second memory cell array 300.

The second memory cell array 300 may be implemented using a nonvolatile memory device. The first memory cell array 200 may be implemented using a nonvolatile memory device. The second memory cell array 300 may be implemented using a memory device that can be addressed on a sector basis.

When a portion of write request data is aligned with a page, the memory selector 100 may select the NAND cell array 200 to store that portion of the write request data. When a portion of the write request data is not aligned with a page, the memory selector 100 may select the PCRAM cell array 300 to store that portion of the write request data.

When write request data is aligned with a page, the start sector address of the write request data coincides with the start sector address of the page and the last sector address of the write request data coincides with the last sector address of the page.

A case where the write request data is not aligned with the page will be described with reference to FIG. 2.

The address map table 400 is configured to manage the addresses of data stored on a sector basis in the PCRAM cell array 300. The data structure of the address map table 400 will be described below with reference to FIG. 4.

In an embodiment of the semiconductor device 1000, the NAND cell array 200 may have a relatively large storage capacity and the PCRAM cell array 300 may have a relatively small storage capacity.

As the operation time of the semiconductor device 100 increases, the storage space of the PCRAM cell array 300 may become scarce. In this case, data stored in the PCRAM cell array 300 may be migrated and stored in the NAND cell array 200.

An embodiment of the semiconductor device 1000 may include a migration controller 500 configured to control the migration operation. The migration operation may be performed by referring to the address map table 400, when a predetermined condition is satisfied. The migration operation will be described below.

Figure 2:
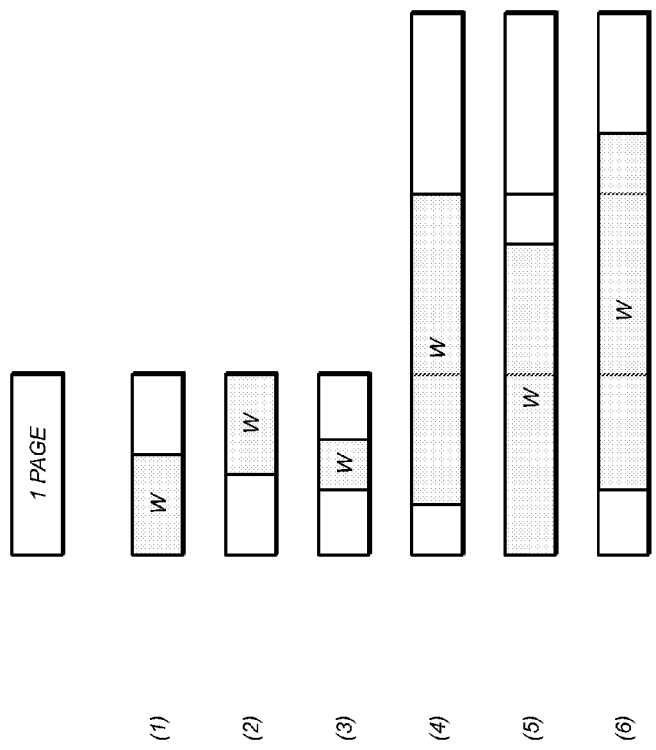
FIG. 2 illustrates examples of cases where a portion of write request data or all of write request data is not aligned with a page.

FIG. 2 illustrates cases where a portion of or all of the write request data W is not aligned with a page.

In the first, second and third cases, the length of the data is relatively smaller than the length of a single page.

In the first case, the start sector address of the write request data coincides with the start sector address of the page but the last sector address of the write request data does not coincide with the last sector address of the page.

In the second case, the last sector address of the write request data coincides with the last sector address of the page but the start sector address of the write request data does not coincide with the start sector address of the page.

In the third case, the start and last sector addresses of the write request data do not coincide with the start and last sector addresses of the page, respectively.

In the fourth, fifth and sixth cases, the length of the write request data is relatively larger than the length of a single page.

In the fourth case, the start sector address of the write request data does not coincide with the start sector address of a first page but the last sector address of the write request data coincides with the last sector address of a second page.

In the fifth case, the start sector address of the write request data coincides with the start sector address of a first page but the last sector address of the write request data does not coincide with the last sector address of a second page.

In the sixth case, the start and last sector addresses of the write request data do not coincide with the start sector address of a first page and the last sector address of a second page, respectively.

Figure 3:
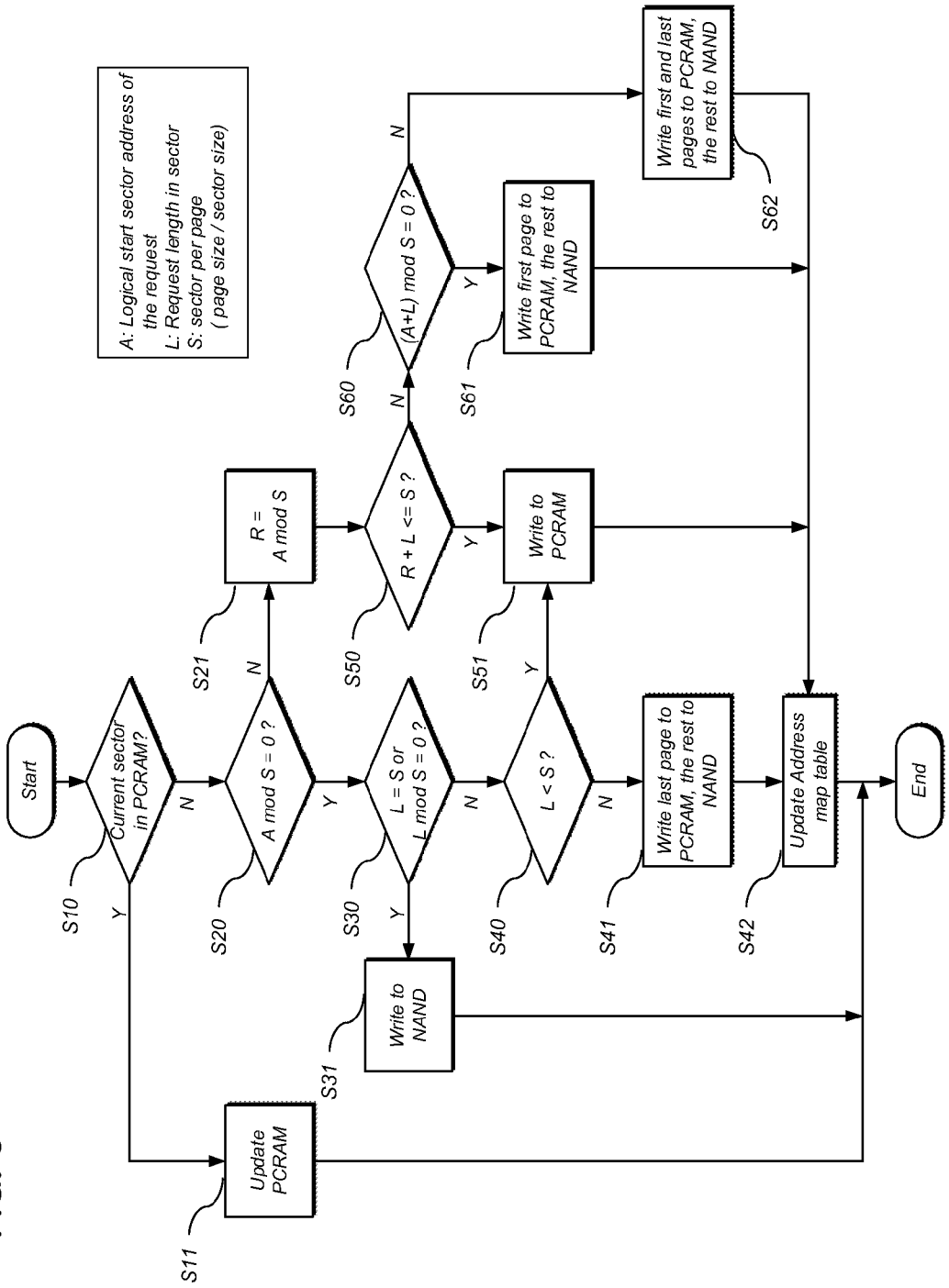
FIG. 3 is a flowchart representation of an example of an operation of an embodiment of a memory selector.

FIG. 3 is a flowchart representation of an example of an operation of an embodiment of the memory selector 100 of FIG. 1.

In the write request data of FIG. 3, a portion of the write request data that is aligned with a page may be selected to be written to the NAND cell array 200, and the remaining portion of the write request data that is not aligned with the page may be selected to be written to the PCRAM cell array 300.

In the flowchart, A represents the logical start sector address of the write request data, L represents the length of the write request data on a sector basis, S represents the number of sectors included in a single page and A+L corresponds to the last sector address of the write request data.

The memory selector 100 may determine whether the write request data is stored in the PCRAM cell array 300 at step S10. If the write request data is stored in the PCRAM cell array 300, the memory selector 100 may update the corresponding data in the PCRAM cell array 300 at step S11 and end the operation.

The memory selector 100 may determine whether the write request data is stored in the PCRAM cell array 300 by referring to the address map table 400. This operation will be described below with reference to the data structure of the address map table 400 illustrated in FIG. 4.

If the write request data is not stored in the PCRAM cell array 300, the memory selector 100 may determine whether the start sector address of the write request data is aligned with the start sector address of the page at step S20.

For example, when the start sector address A of the write request data is divided by the number S of sectors in the page (A mod S=0), the memory selector 100 may determine that the start sector address of the write request data is aligned with the start sector address of the page.

When the start sector address of the write request data is aligned with the start sector address of the page, the memory selector 100 may determine whether the length L of the write request data is a multiple of the number S of sectors in a single page at step S30.

When the determination result at step S30 is "Y" or yes, it may indicate that the write request data is aligned with the page and the memory selector 100 may select the NAND cell array 200 to process the write request at step S31.

When the determination result at step S20 is "N" or no, the memory selector 100 may identify the sector of the page the start sector of the write request data corresponds to at step S21. For example, the sector may correspond to a rest R obtained by dividing the start sector address A of the write request data by the number S of sectors in the page.

The memory selector 100 may determine whether a value obtained by adding the rest R and the length L of the write request data is equal to or less than the number S of sectors in the page at step S50. Through this operation, it is possible to determine whether the write request data is in a single page.

When the write request data is in a single page, the memory selector 100 may select the PCRAM cell array 300 to process the write request at step S51. Then, the memory selector 100 may update the address map table 400 at step S42 and end the operation. The process of updating the address map table 400 will be described with reference to the data structure of the address map table 400 of FIG. 4.

When the determination result at step S50 is "N" or no, that is, when the last sector address and the start sector address of the write request data are on different pages, the memory selector 100 may determine whether the last sector address A+L of the write request data corresponds to a multiple of the number S of sectors in a single page at step S60.

When the determination result at step S60 is "Y" or yes, that is, when the last sector address of the write request data is aligned with the last sector address of the page, the memory selector 100 may select the PCRAM cell array 300 for a portion of the write request data in the first page and may select the NAND cell array 200 for the remaining portion of the write request at step S61. Then, the memory selector 100 may update the address map table 400 at step S42 and end the operation.

When the determination result at step S60 is "N" or no, that is, when the last sector address of the write request data is not aligned with the last sector address of the page, the memory selector 100 may select the PCRAM cell array 300 for the portion of the write request data on the first and last pages to process the write request and may select the NAND cell array 200 for the remaining portion of the write request data to process the write request at step S62. Then, the memory selector 100 may update the information of the address map table 400 at step S42 and end the operation.

When the determination result at step S30 is "N" or no, that is, when the start sector address of the write request data is aligned with the start sector address of the page but the length of the write request data is not a multiple of the number of sectors in the page, the memory selector 100 may determine whether the length of the write request data is relatively smaller than the number S of sectors in a single page at step S40.

When the determination result at step S40 is "Y" or yes, that is, when the length L of the write request data is relatively smaller than the number S of sectors in a single page, the memory selector 100 may select the PCRAM cell array 300 to process the write request at step S51. Then, the memory selector 100 may update the address map table 400 at step S42 and end the procedure.

When the determination result at step S40 is "N" or no, that is, when the length L of the write request data is relatively larger than the number S of sectors included in a single page, the memory selector 100 may select the PCRAM cell array 300 for the portion of the write request data corresponding to the last page to process the write request and may select the NAND cell array 200 for the remaining portion of the write request data to process the write request at step S41. Then, the memory selector 100 may update the address map table 400 at step S42 and end the operation.

The operation of selecting the NAND cell array 200 to process the write request can be performed through a general FTL (Flash Translation Layer) operation.

The operation of selecting the PCRAM cell array 300 to process the write request can be performed through an operation of storing information in a general PCRAM cell array. In this case, however, an operation of mapping a page address and a sector address in the address map table 400 is performed.

Figure 4:
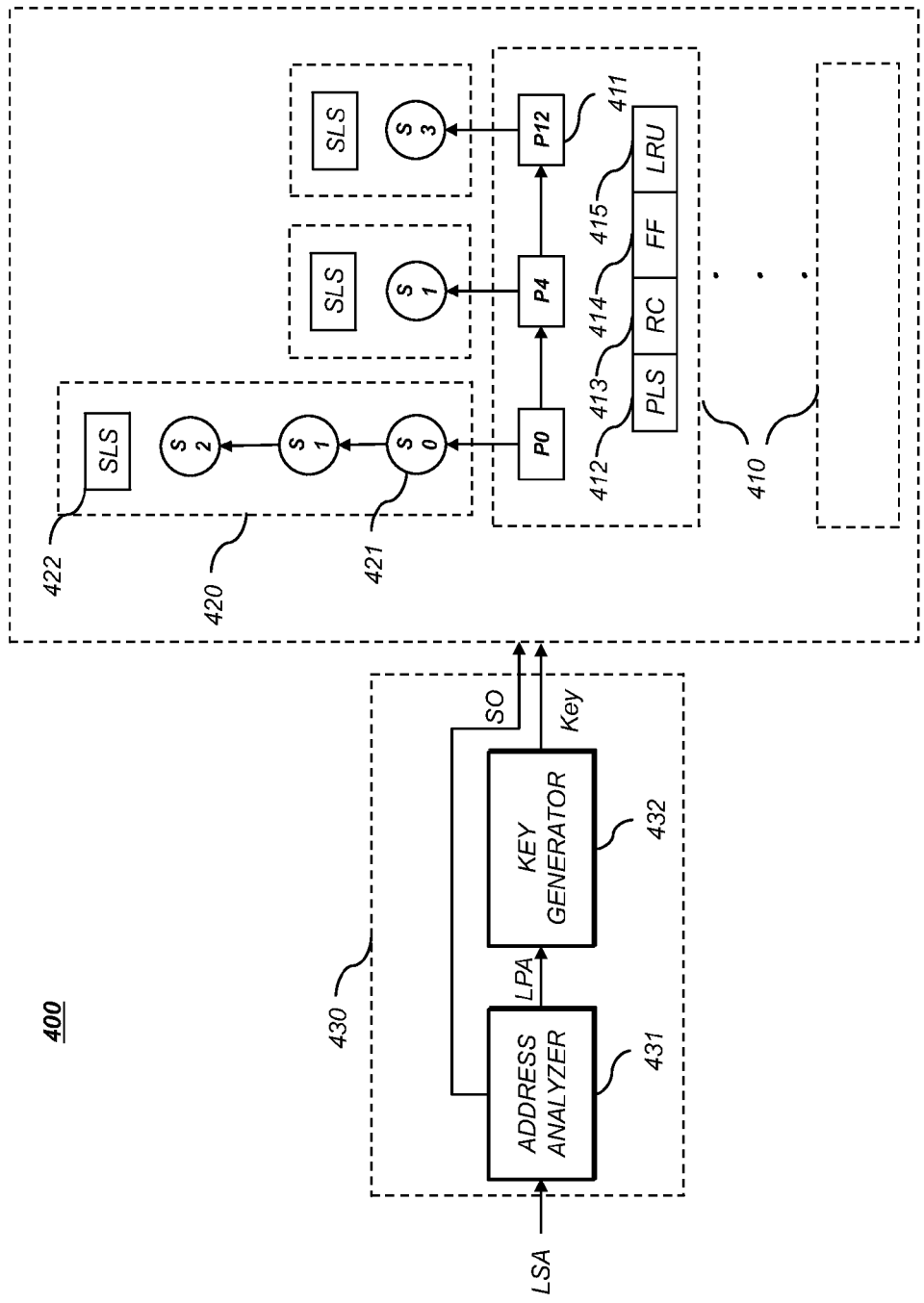
FIG. 4 is a block diagram representation of an embodiment of a data structure of an address map table.

FIG. 4 is a block diagram representation of an embodiment of the data structure of the address map table 400.

The address map table 400 may include a page list 410 and a sector list 420 corresponding to each page node 411 in the page list 410.

The sector list 420 may include a sector node 421 with the corresponding page node 411. The address map table 400 may structuralize a write request sector into the page list 410 and the sector list 420 to store the write request sector. Each of the page list 410 and the sector list 420 may be implemented using a linked list.

The page list 410 may include PLS (Page List Size) information 412 corresponding to the number of page nodes, RC (Read Counter) information 413 of each page node, information for an FF (Frequency Filter) 414 to detect the access frequency of each page, and LRU (Least Recently Used) information 415 on each page node, in addition to the page nodes 411.

The FF may be used to compare the access frequency of each page node to a reference value to determine whether the page node has a hot or cold property.

The sector list 420 may include SLS (Sector List Size) information 422 corresponding to the number of sector nodes 421 in addition to the sector nodes 421.

The PLS information 412, the RC information 413, the FF information 414, and the LRU information 415 of each page node, and the SLS information 422 may be used to select data to migrate from the PCRAM cell array 300. The migration operation will be described below.

The address map table 400 may include an address converter 430 configured to convert an input sector address into an access for accessing the page list 410 and the sector list 420. The address converter 430 may include an address analyzer 431 and a key generator 432.

For example, when a write request for specific sector data is received, the address analyzer 431 may convert a sector address LSA into a page address LPA and a sector offset SO. The relationship between the sector address LSA, the page address LPA, and the sector offset SO may be expressed by Equation 1 below. In Equation 1, S represents the number of sectors included in a page.

$$LPA = \left\lfloor \frac{LSA}{S} \right\rfloor,$$
$$SO = LSA \bmod S$$
[Equation 1]

For example, when the sector address LSA is 1025 and the number S of sectors included in the page is 8, the page address LPA has a value of 128 and the sector offset SO has a value of 1.

Then, the key generator 432 may generate a key by applying a hash function to the page address LPA. The key generated by applying the hash function to the page address LPA may indicate a page list 410 including a page node 411 corresponding to the page address LPA.

The key generated by the hash function may be related to one or two page addresses LPA. When a single key is related to several page addresses LPA, a page address LPA may be related to one of a plurality of page nodes 411 included in the page list 410 corresponding to the key.

The page node 411 may be related to the sector list 420 including one or more sector nodes 421, and each of the sector nodes 421 may be related to the sector offset information SO.

After the sector address LSA is used to generate the page address LPA and the sector offset OA, the address map table 400 may be used to determine whether the sector data is stored in the PCRAM cell array 300.

When sector data is newly stored in the PCRAM cell array 300, the sector address of the corresponding sector data may be used to generate a page address and a sector offset, and the address map table 400 may be updated by adding the corresponding page node 411 and the corresponding sector node 421 to the page list 410 and the sector list 420, respectively.

The address map table 400 may be stored in a portion of the PCRAM cell array 300, or may be stored in a separate nonvolatile memory device. The separate nonvolatile memory device may include a memory device that can be addressed at least on a sector basis.

The address map table 400 may use a separate memory device, such as for example SRAM or DRAM, that can perform a relatively high-speed operation as a cache when the semiconductor device 1000 is used.

In this case, during the operation of the semiconductor device 1000, the address map table 400 stored in SRAM or DRAM may be updated, and backed up in a portion of the PCRAM cell array 300 or in a separate nonvolatile memory device before the operation of the semiconductor device 1000 is ended.

Hereafter, the operation of the migration controller 500 will be described.

The PCRAM cell array 300 may be designed to have a relatively smaller size than the NAND cell array 300. In this case, when the semiconductor device 1000 is used, the storage space of the PCRAM cell array 300 may become scarce. Thus, a migration operation of migrating data stored in the PCRAM cell array 300 into the NAND cell array 200 may be performed.

The migration controller 500 may control the migration from the PCRAM cell array 300 to the NAND cell array 200. During the migration operation, the migration controller 500 may refer to the address map table 400.

The migration controller 500 may control a migration operation on a page basis, and start the migration operation in the following cases:

I) when sectors stored in the sector list 420 can be used to generate a sound page (SLS=S), II) when the PCRAM cell array 400 has no empty space or has a space equal to or less than a predetermined level, and III) when a NAND block including sectors stored in the PCRAM cell array 400 becomes a garbage collection target.

In case I, the corresponding sectors capable of completing a page may be migrated and stored into the NAND cell array 200. Thus, the migration controller 500 does not need to separately select a migration target page.

In case II, the migration controller 500 first selects a migration target page. Various selection standards may be applied.

First, the migration controller 500 may select the least recently used page from among the pages stored in the address map table 400 by referring to the LRU information 415 on the pages stored in each of the page lists 410, and may migrate the selected page.

Second, the migration controller 500 may select a page that is determined to have a cold property using the FF information 414 and may migrate the selected page.

Third, the migration controller 500 may select a page having a relatively smaller count value using the RC count information 413 of the page nodes 411 and may migrate the selected page.

Fourth, the migration controller 500 may select a page of which the sector list size 422 is the closest to the number S of sectors included in a single page and may migrate the selected page.

Various selection standards may exist, and the above-described standards may be combined in various manners and used as a selection standard.

Unlike case I, in case II, RMW operations may be performed when the sectors forming a part of the page are migrated to the NAND cell array 200. However, the number of RMW operations performed during the migration may be relatively considerably lower than the number of RMW operations performed in a conventional semiconductor device including only the NAND cell array 200.

The case III may be performed as a part of the garbage collection operation. In this state, a migration target page is already determined as a page included in a victim block. In this case, the following embodiments may be applied.

In an embodiment, the information of the PCRAM cell array 300 and the information of the NAND cell array 200 may be combined and stored in the NAND cell array 200, and the corresponding information may be removed from the address map table 400.

In this case, garbage collection may be performed as a process where pages of the victim block in the NAND cell array 200 are sequentially and temporarily stored in a register, sector data corresponding to the pages are read from the PCRAM cell array 300 to update the data of the register, and the data of the register are copied to a new block.

This operation may be considered a type of RMW operation. However, since read and write operations of the RMW operation are performed during the garbage collection operation, the increase of additional load caused by the migration may be relatively insignificant.

In an embodiment, the data stored in the PCRAM cell array 300 may be left as it is, and garbage collection may be performed only in the NAND cell array 200. In this case, migration from the PCRAM cell array 300 to the NAND cell array 200 may not substantially occur.

In the case where the data is stored in the NAND cell array 200, the relationship between a logical address and a physical address may be managed through the FTL. Although the physical address is changed during the garbage collection operation, the relationship between the logical address and the physical address may be still managed through the FTL. In this connection, the data of the PCRAM cell array 300 may not need to be intervened in the garbage collection process.

When the migration is not performed during the garbage collection process, the performance of the garbage collection may not be degraded. In this case, the proportion of the migration operation including RWM operations may be increased as in the case II.

In an embodiment, the semiconductor device may not perform RMW operations during a typical write operation. Thus, the semiconductor device may prevent the reduction in performance thereof and the number of garbage collection operations, and may improve the lifespan thereof.

Referring to FIG. 5, a block diagram representation of a system 1000 including an embodiment of a semiconductor memory apparatus 1350 is shown. In an embodiment, the semiconductor memory apparatus 1350 is an embodiment of the semiconductor device 1000 shown in FIG. 1.

An embodiment of the semiconductor memory apparatus 1350 may include a first memory cell array configured to store data according to a first address on a first basis, a second memory cell array configured to store data according to a second address on a second basis that is relatively smaller than the first basis, a memory selector configured to select one of the first memory cell array and the second memory cell array to store data during a write request, and an address map table configured to store mapping information between the first and second addresses for data stored in the second memory cell array.

Examples of the semiconductor memory apparatus 1350 include, but are not limited to, dynamic random access memory, static random access memory, synchronous dynamic random access memory (SDRAM), synchronous graphics random access memory (SGRAM), double data rate dynamic ram (DDR), and double data rate SDRAM.

The memory controller 1200 is used in the design of memory devices, processors, and computer systems. The system 1000 may include one or more processors or central processing units ("CPUs") 1100. The CPU 1100 may be used individually or in combination with other CPUs. While the CPU 1100 will be referred to primarily in the singular, it will be understood by those skilled in the art that a system with any number of physical or logical CPUs may be implemented A chipset 1150 may be electrically coupled to the CPU 1100. The chipset 1150 is a communication pathway for signals between the CPU 1100 and other components of the system 1000, which may include the memory controller 1200, an input/output ("I/O") bus 1250, and a disk drive controller 1300. Depending on the configuration of the system 1000, any one of a number of different signals may be transmitted through the chipset 1150, and those skilled in the art will appreciate that the routing of the signals throughout the system 1000 can be readily adjusted without changing the underlying nature of the system.

As stated above, the memory controller 1200 may be electrically coupled to the chipset 1150. The memory controller 1200 can receive a request provided from the CPU 1100, through the chipset 1150. In alternate embodiments, the memory controller 1200 may be integrated into the chipset 1150. The memory controller 1200 may be electrically coupled to one or more semiconductor memory apparatuses 1350. The semiconductor memory apparatuses 1350 may be any one of a number of industry standard memory types, including but not limited to, single inline memory modules ("SIMMs") and dual inline memory modules ("DIMMs"). Further, the memory devices 1350 may facilitate the safe removal of the external data storage devices by storing both instructions and data.

The chipset 1150 may be electrically coupled to the I/O bus 1250. The I/O bus 1250 may serve as a communication pathway for signals from the chipset 1150 to I/O devices 1410, 1420 and 1430. The I/O devices 1410, 1420 and 1430 may include a mouse 1410, a video display 1420, or a keyboard 1430. The I/O bus 1250 may employ any one of a number of communications protocols to communicate with the I/O devices 1410, 1420, and 1430. Further, the I/O bus 1250 may be integrated into the chipset 1150.

The disk drive controller 1450 may also be electrically coupled to the chipset 1150. The disk drive controller 1450 may serve as the communication pathway between the chipset 1150 and one or more internal disk drives 1450. The internal disk drive 1450 may facilitate disconnection of the external data storage devices by storing both instructions and data. The disk drive controller 1300 and the internal disk drives 1450 may communicate with each other or with the chipset 1150 using virtually any type of communication protocol, including all of those mentioned above with regard to the I/O bus 1250.

The system 1000 described above in relation to FIG. 4 is merely one example of a system employing a semiconductor memory apparatus 1350. In alternate embodiments, such as cellular phones or digital cameras, the components may differ from the embodiment shown in FIG. 4.

While certain embodiments have been described above, it will be understood to those skilled in the art that the embodiments described are by way of example only. Accordingly, the semiconductor device described herein should not be limited based on the described embodiments. Rather, the semiconductor device described herein should only be limited in light of the claims that follow when taken in conjunction with the above description and accompanying drawings.

What is claimed is:

1. A semiconductor device comprising:
    a first memory cell array configured to store data according to a first address on a first basis;
    a second memory cell array configured to store data according to a second address on a second basis that is relatively smaller than the first basis;
    a memory selector configured to select one of the first memory cell array and the second memory cell array to store data during a write request;
    an address map table configured to store mapping information between the first and second addresses for data stored in the second memory cell array; and
    a migration controller configured to migrate a portion of the data stored in the second memory cell array into the first memory cell array by referring to the address map table,
    wherein the address map table comprises:
        a first list comprising a first node corresponding to the first address; and
        a second list comprising a second node associated with the first list and the second address, and
    wherein the migration controller is configured to select data from the second memory cell array and to migrate the selected data into the first memory cell array when a residual space of the second memory cell array is equal to or less than a threshold value.

2. The semiconductor device of claim 1, wherein the memory selector is configured to select the first memory cell array to store a portion of the write request data that is aligned with the first address, and is configured to select the second memory cell array to store the remaining portion of the write request data that is not aligned with the first address.

3. The semiconductor device of claim 1, wherein the address map table further comprises an address converter configured to generate an index value indicating the first and second nodes from the second address.

4. The semiconductor device of claim 3, wherein the address converter comprises:
    an address analyzer configured to generate the first address and an offset value from a ratio of the first basis to the second basis and the second address; and
    a key generator configured to generate a key by applying a hash function to the second address.

5. The semiconductor device of claim 4, wherein the first list is associated with the key, the first node in the first list is associated with the first address used to generate the key, and the second node in the second list associated with the first node is associated with the offset value.

6. The semiconductor device of claim 1, wherein the first and second lists comprise linked lists.

7. The semiconductor device of claim 1, wherein the migration controller is configured to migrate data corresponding to the second list, wherein the second list includes the same number of second nodes as a ratio of the first basis to the second basis, from the second memory cell array into the first memory cell array.

8. The semiconductor device of claim 1, wherein the first list is configured to store LRU (Least Recently Used) information on the first nodes, and the migration controller is configured to migrate data, corresponding to the first node, wherein the first node was least recently accessed from among the first nodes, from the second memory cell array into the first memory cell array by referring to the LRU information.

9. The semiconductor device of claim 1, wherein the first list is configured to store access frequency information on the first nodes, and the migration controller is configured to migrate data corresponding to a first node having an access frequency equal to or less than a threshold value from among the first nodes from the second memory cell array into the first memory cell array.

10. The semiconductor device of claim 1, wherein the first list is configured to store read count information on the first nodes, and the migration controller is configured to migrate data, corresponding to the first node having a minimum read count from among the first nodes, from the second memory cell array into the first memory cell array.

11. The semiconductor device of claim 1, wherein the migration controller is configured to migrate data corresponding to a first node, wherein the number of second nodes associated with the first node is closest to a ratio of the first basis to the second basis, from the second memory cell array into the first memory cell array.

12. The semiconductor device of claim 1, wherein the migration controller is configured to migrate data associated with an address garbage-collected in the first memory cell array, from the second memory cell array into the first memory cell array.

13. The semiconductor device of claim 1, wherein the first basis is a page basis, the second basis is a sector basis, the first address is a page address, and the second address is a sector address.

14. The semiconductor device of claim 13, wherein the first memory cell array comprises a NAND cell array, and the second memory cell array comprises a PCRAM cell array.

* * * * *